Feb. 7, 1933.  A. HOEFFLEUR  1,896,407
CONVEYER
Filed June 29, 1931   3 Sheets-Sheet 1
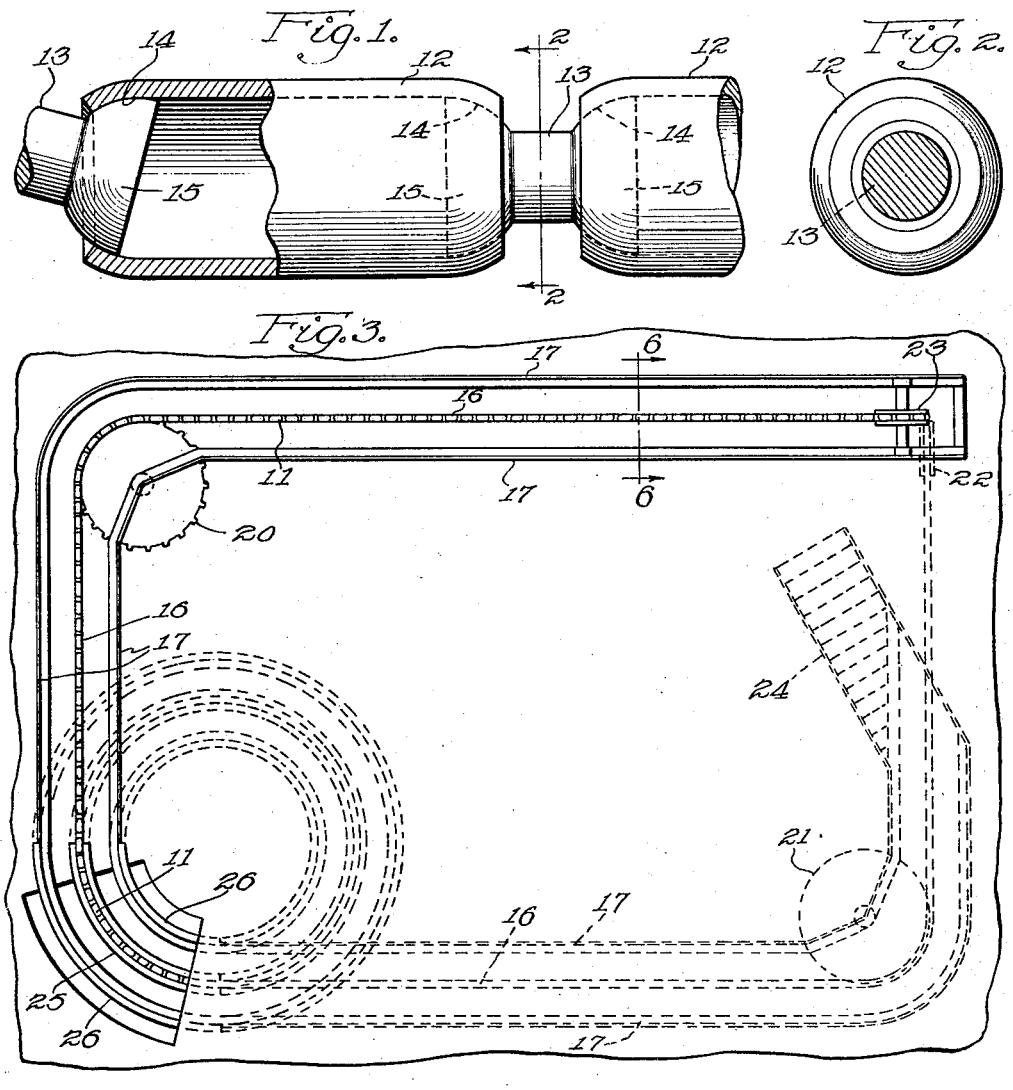
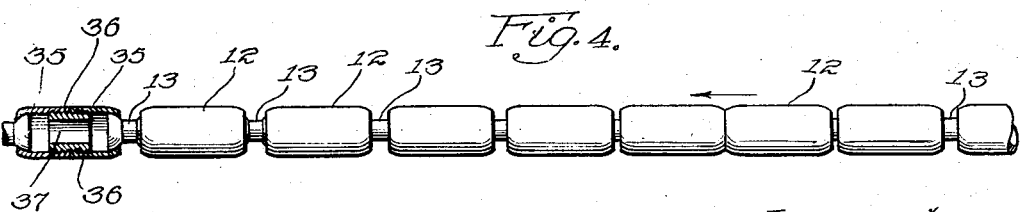

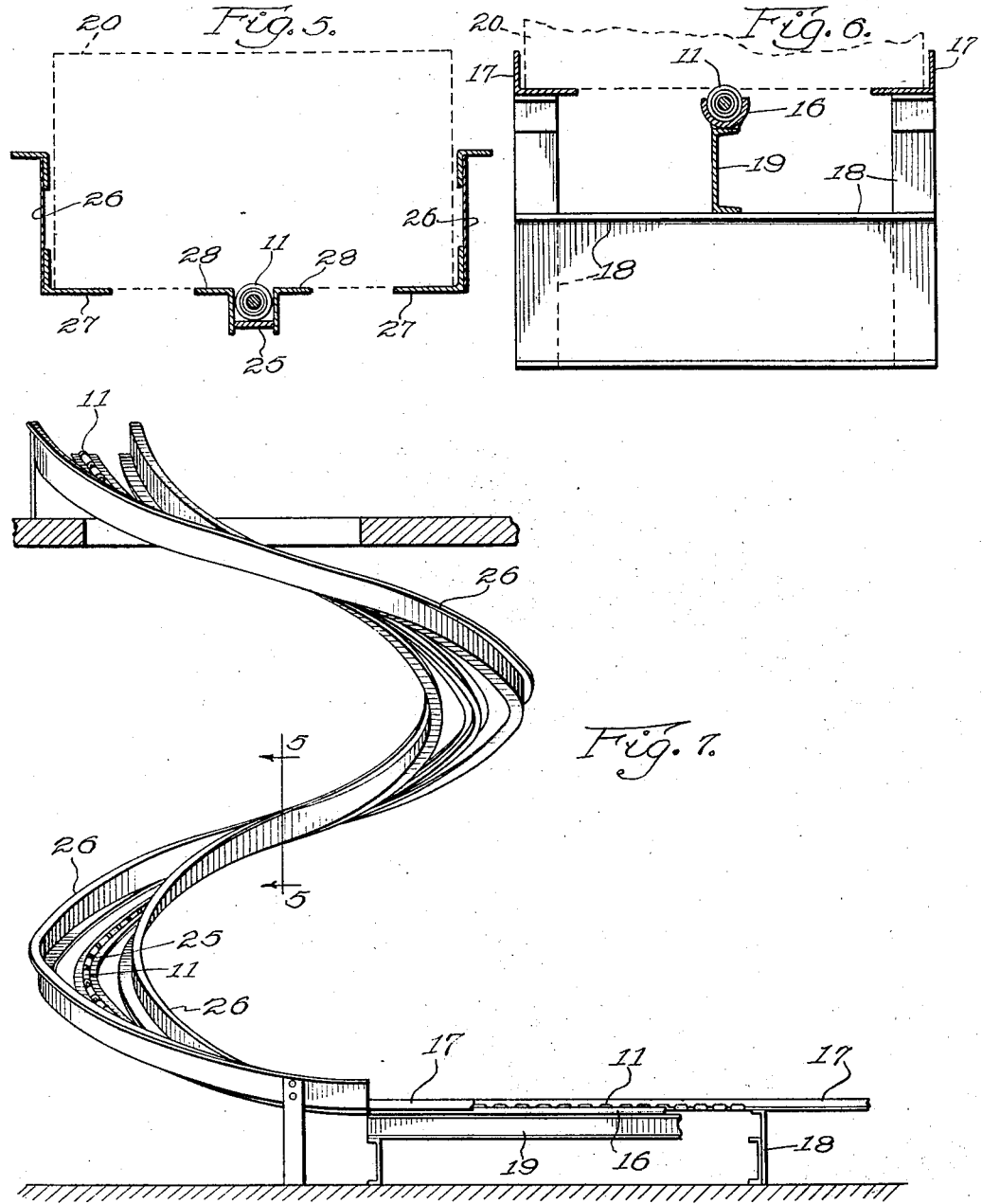

Feb. 7, 1933.   A. HOEFFLEUR   1,896,407
CONVEYER
Filed June 29, 1931   3 Sheets-Sheet 3

Witness
Arthur M. Framke.

Inventor
Arthur Hoeffleur
by Hummler, Hummler & Woodworth
Attys:

Patented Feb. 7, 1933

1,896,407

UNITED STATES PATENT OFFICE

ARTHUR HOEFFLEUR, OF CHICAGO, ILLINOIS

CONVEYER

Application filed June 29, 1931. Serial No. 547,720.

This invention relates to improved chain conveyers and more particularly to conveyers employing universal joint chains capable of being turned or twisted in any direction.

The main objects of this invention are to provide an improved form of conveyer capable of making a short radius turn in any direction; to provide a conveyer wherein the chain may be returned by way of the shortest convenient path, through a channel or conduit, and without the use of costly sprockets and bearings; to provide a conveyer chain of which the body members and connecting links are each of one-piece construction capable of long use and with no vital parts wherein frictional wear would decrease the life of the chain; to provide an improved form of drag conveyer capable of handling material without the use of chain dogs; to provide an improved chain structure suitable for use in a slat conveyer in which the return flight can be twisted and inverted in order to utilize the slat surface simultaneously in two directions; to provide an improved form of spiral conveyer in which the rate of travel of the material handled is controlled through the use of an improved chain structure, thereby permitting a greatly increased conveyer pitch without danger of damage to the material handled; and to provide a conveyer chain having a self contained automatic take-up feature, thereby eliminating the common costly automatic take-up devices.

Three specific embodiments of this invention are shown in the accompanying drawings, in which:

Figure 1 is a view showing the conveyer chain, a portion being in section.

Fig. 2 is an end view of the same.

Fig. 3 is a somewhat diagrammatic plan view of a combination drag conveyer and spiral conveyer, the portion on the floor below being shown dotted.

Fig. 4 is a view of the conveyer chain showing the telescoping action of the links which provides the automatic take-up.

Fig. 5 is a section on line 5—5 of Fig. 7.

Fig. 6 is a section on line 6—6 of Fig. 3.

Fig. 7 is an elevation of the spiral conveyer and a portion of the drag conveyer shown in Fig. 3, the conveyer supporting members being omitted.

Figure 8:
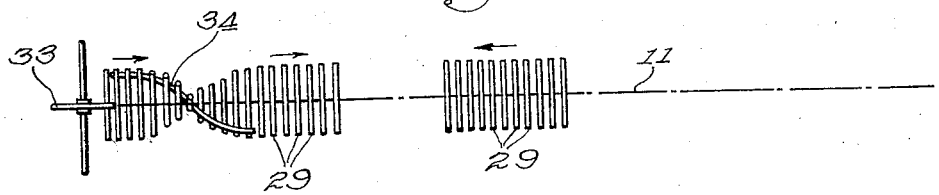
Fig. 8 is a diagrammatic plan view of a two-way slat conveyer, only a portion of the cross bars being shown.

As shown in the drawings, the chain 11 is made up of body members 12 inter-connected by shank links 13 to form an endless chain of any desired length. The body members 12 are preferably hollow and of cylindrical form and are rolled, swedged or spun at each end to provide an unbroken annular socket rim forming an internal spherical bearing surface 14 to rotatably seat and retain the head 15 of the shank link 13. In this manner a ball and socket connection of great strength is formed at each connection of the body members 12 and the shank links 13.

The shank links 13 are provided with a head 15 at each end of the shank portion and are shaped substantially like a dumb-bell. The head 15 is formed with a spherical surface and in the preferred form is the shape of a truncated hemisphere to reduce the weight and cost of the material.

In practice the shank links are either drop forged units or screw machine products having the heads 15 integral on the shank portion, the largest diameter of the head being slightly smaller than the inside diameter of the body member at the spherical bearing surface portion 14. The body members are formed in one piece units from seamless mechanical tubing or its equivalent, and the ends are rolled or swedged after the shank links have been inserted to their normal operating position. The body members may also be castings if desired and unit lengths of chain may be cast in one operation, the shank links in this case being first finished, then set into the flask or mold with the cores, and the body members cast around them.

The drag conveyer shown in Fig. 3 comprises the chain 11 sliding in a chain guide channel 16 located along the center line of the conveyer, and side guide angles 17 spaced from the chain guide channel 16 and extending parallel with it to confine the conveyed material to the conveyer.

The chain channel 16 and the guide angles 17, as shown in Fig. 6, are suitably supported at the desired height from the floor by means of structural or cast iron frames 18 located at suitable intervals along the conveyer run, the chain channel being supported by the member 19 at a definite height so that the top portion of the chain will project upwards a short distance beyond the level of the horizontal legs of the guide angles 17.

The chain channel 16 is constructed so that its depth is somewhat smaller than the diameter of the chain 11 so that the material 20 being conveyed will ride continuously on the chain 11 and thus be moved along the conveyer.

Referring to Fig. 3, it will be seen that the drag conveyer leads directly into a spiral conveyer which conducts the conveyed material to a lower floor and then delivers it to another drag conveyer. All three conveyers are being simultaneously operated by the one chain 11. It is apparent, however, that each conveyer may be arranged to be operated with independent chains and drives.

The chain 11, starting on the first drag conveyer, passes over a drive sprocket 20 located at the first turn, and then onto a spiral conveyer which leads to the next floor below. The chain follows around the spiral conveyer and is then delivered onto the drag conveyer on which it continues to travel around an idler sprocket 21 over a sprocket 22 from which it continues upwards and over a sprocket 23 and back onto the upper drag conveyer. The only driving sprocket is sprocket 20, located in the first turn of the upper drag conveyer. The sprockets 21, 22 and 23 are merely idler sprockets to change the direction of travel of the chain 11. At the end of the lower drag conveyer an automatic unloader 24 is shown, which removes the conveyed material from the chain.

The spiral conveyer as shown in Fig. 7 comprises a chain guide channel 25 located along the center line of the bed level of the conveyer, and side wall portions 26 which run parallel to the chain guide channel 25 and extend vertically a height sufficient to keep the conveyed material on the conveyer. As shown in Fig. 5, the side wall portions of the spiral conveyer are provided with legs 27 which extend inwardly toward the center line of the conveyer, thus forming a portion of the conveyer bed. The chain guide channel 25 is also provided with horizontal members 28 which extend outward from the center line on the conveyer to serve also as a portion of the conveyer bed, the horizontal members 27 and 28 being in the same plane. The chain guide channel 25 is designed to have a depth somewhat smaller than the diameter of the chain 11, so that the upper portion of the chain 11 will extend above the conveyer bed level.

Figure 9:
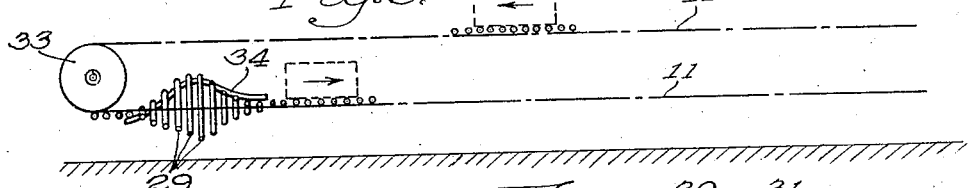
Fig. 9 is a side view of the same.
Figure 10:
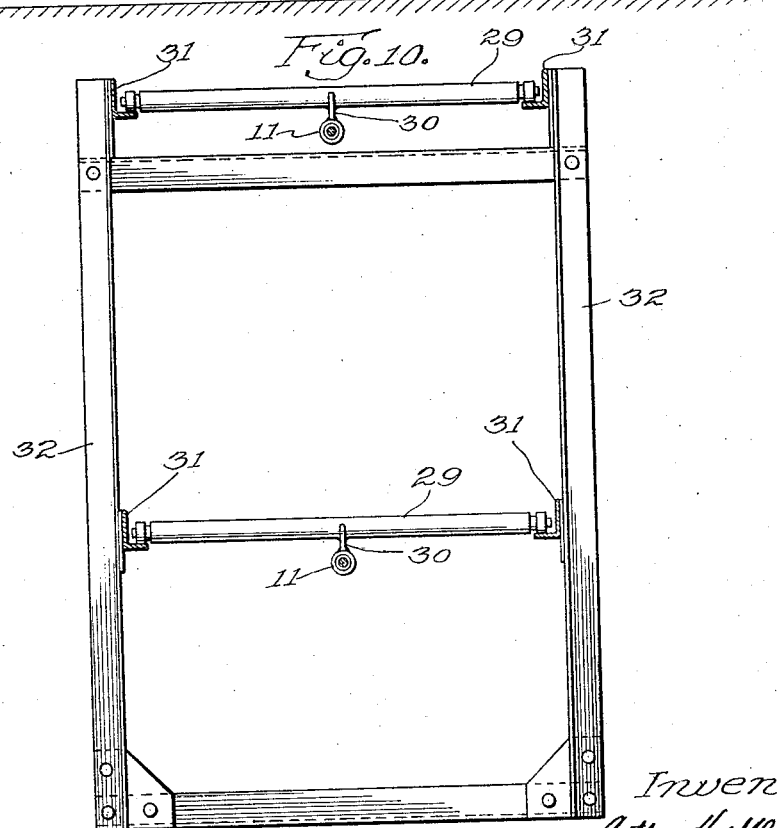
Fig. 10 is a typical section through a two-way slat conveyer.

A slat or cross bar conveyer shown in Figs. 8, 9 and 10 comprises a chain 11 on which are fastened a plurality of slats or cross bars 29. The slats 29 are arranged horizontally across the chain 11 at right angles to the direction of travel, and each slat or cross bar is fastened directly to a body member of the chain 11 by means of a suitable attachment 30 bolted, welded or otherwise fastened to the cross bar and body member. The slats or cross bars 29 are supported and maintained in horizontal position by the angle tracks 31 on the supporting framework 32. As shown in Figs. 9 and 10, the slats or cross bars 29 are preferably located above the chain 11, the chain 11 being supported or hung from the cross bars 29.

In order that the return run of the slat conveyer may be utilized, and thus form a two-way slat conveyer, the chain 11 is passed over the driving sprocket 33 and the cross bars 29 are brought into contact with a twister or spiral cam 34 on which one end of each cross bar rides to be swung over or twisted, with its supporting chain body member, through an angle of 180°, thus reversing their relative position and putting the cross bars on top of the chain 11 which serves as the axis of the twisting motion. The twister or spiral cam 34 is merely a suitably shaped member that is supported or hung from the main conveyer structure adjacent the lower level of the conveyer chain.

It can be seen from Fig. 9 that as the chain 11 passes over the drive sprocket 33 the cross bars 29 become inverted and, as the chain leaves the drive sprocket, the cross bars are located below the chain in a position unsuitable to handle material properly. The twister 34 located just behind the drive sprocket 33 automatically turns the cross bars over so that they ride above the conveyer chain 11. The chain 11, being the type of structure shown in Fig. 1, can be readily twisted in any direction, thus making a two-way slat conveyer possible.

The conveyers and conveyer chain herein shown and described all include an inherent automatic take-up feature due to the chain structure as shown in Fig. 1. The body member 12 being cylindrical and hollow will allow the shank link connecting member 13 to partially telescope into the body section. Thus, under slack conditions, the body members 12 can be pushed together until their ends abut.

In operation, as the conveyer chain leaves the driving sprocket, whatever slack may be in the chain is automatically taken up through the telescoping action of the connecting shank links with no buckling, kinking or displacement of the chain. As shown in Fig. 4, the body members 12 are pushed together as they leave the drive sprocket until all slack is taken up. This action begins immediately that the chain leaves the sprocket and then, the chain being endless, the chain members successively come under tension and the links pull out to their normal positions to continue on their way.

In the manufacture of the herein described conveyers the chain is made up in unit lengths to facilitate handling and, in order to join the unit lengths to make up the complete chain, special threaded connecting links are necessary at each end of each length. One of the threaded connecting links is shown in section in Fig. 4. In this case the body member is transversely split at the middle into two parts 35 and each part is internally threaded at the inside end at 36 to receive a threaded nipple 37. In assembling the complete chain the threaded half links 35 at the ends of the unit lengths of chain are screwed onto the nipple 37 until the ends of each half link 35 abut. To prevent the joint from unscrewing and inadvertently coming apart, a punch mark is made at the joint, after assembly, which effectively prevents turning of the half links 35 relative to each other.

The principal advantage of conveyers made in accordance with my invention lies in the fact that the chain may be turned on a very short radius in any direction. This feature is impossible with the ordinary conveyer chains and, as a result, the usual conveyer must include many large costly sprockets and occupy considerable space that might otherwise be saved.

The ordinary conveyer must confine its short radius turns to one plane, and turns in other planes must be made on a very long radius. This fact materially increases the cost of conveyer installations and in many instances the cost of accompanying equipment. Conveyers embodying my invention can make a short radius turn in any plane or direction, thereby making it possible to lay out more compact installations and permit considerable saving in cost, since the chain return may be made by way of the shortest convenient route and through conduit or guide channels without the necessity of sprockets or pulleys to make the turns.

The automatic take-up feature of my conveyers and chain also permits the saving of space and a considerable reduction of the cost of an installation. In the usual practice the conveyer take-up device is located just past the discharge side of the driving mechanism, is often very inconvenient to locate, and is ordinarily a costly, complex structure. My invention eliminates the ordinary take-up device since the chain automatically performs this action itself, as has been heretofore described.

In the operation of the drag conveyer the material handled rides directly on the chain body members and is thereby carried along without the use of chain dogs or the like. This permits an unusually simple and inexpensive structure and installation.

In the operation of the spiral conveyers the chain serves to prevent the conveyed material from sliding, and the descent is made at a definite controlled speed. This permits a spiral conveyer of greatly increased pitch, almost twice that of the ordinary structure, and therefore materially reduced cost. Furthermore, the danger of smashed or damaged goods, due to a too rapid descent, is eliminated. Also, such a conveyer may be used in the reverse direction if desired, the chain then acting as an upwardly inclined drag conveyer.

The slat or cross bar conveyer designed according to my invention and in combination with one or more of the herein described twisting devices permits installations heretofore impossible. Such conveyers can be run from one floor to another and turn to any direction or elevation, the twister serving to always automatically keep the cross bars on the proper side of the conveyer chain.

Although but one specific form of chain structure and several specific applications thereof have been herein shown and described, it will be understood that numerous details of the constructions shown may be altered or omitted without departing from the spirit of this invention as defined by the following claims.

I claim:

1. A conveyer comprising a chain of hollow body members, shank links connecting said body members, enlarged spherical heads on said shank links, internal spherical bearing surfaces adjacent the ends of said body members and formed to retain the heads of said shank links, cross bars secured to said chain of body members and arranged transversely across the path of said chain, each of said cross bars being rigidly secured to an adjacent chain body member, guide means to maintain said cross bars in a horizontal plane and to guide said bars and chain along a predetermined path, and driving means to move said chain of body members.

2. A conveyer, comprising a chain of hollow body members, shank links connecting said body members, enlarged spherical heads on said shank links, internal spherical bearing surfaces adjacent the ends of said body members and formed to retain the heads of said shank links, cross bars secured to said chain of body members transversely to the path of said chain, each of said cross bars being rigidly secured to an adjacent chain body member, guide means to support and maintain said cross bars in a horizontal plane, sprocket means to change the elevation of said chain and reverse the relative direction of travel, twisting means arranged to coact with said cross bars to twist said chain and change the position of said cross bars from one side of said chain to the opposite side of said chain, and driving means to move said chain of body members.

3. A conveyer having a chain comprising a series of alternately arranged members having headed ends and members having socketed ends, the latter having their sockets formed with contracted end margins forming integral endlessly annular lips embracing and securing the heads of the former within said sockets.

4. A conveyer comprising a chain of one-piece elongated body members each formed with apertures at its ends, and dumb-bell-shaped connecting members arranged alternately between said body members with each dumb-bell head disposed within a body member end aperture respectively, the end margins of said body members being each uniformly contracted to form an endlessly annular socket rim embracing and retaining a respective dumb-bell head.

5. A conveyer comprising a chain of body members, ball and socket connections between said body members, a plurality of carriers secured to said chain of body members and arranged transversely across the path of said chain, each of said carriers being secured to and carried by an adjacent body member, guide means to maintain the position of said carriers normally in the same plane relative to each other, and means coacting with said carriers to twist said chain and change the relative positions of said carriers.

Signed at Chicago in the county of Cook and State of Illinois this 25 day of June 1931.

ARTHUR HOEFFLEUR.